April 1, 1958        R. F. GOODE        2,829,331
VOLTAGE REGULATED POWER SUPPLY
Filed April 6, 1953
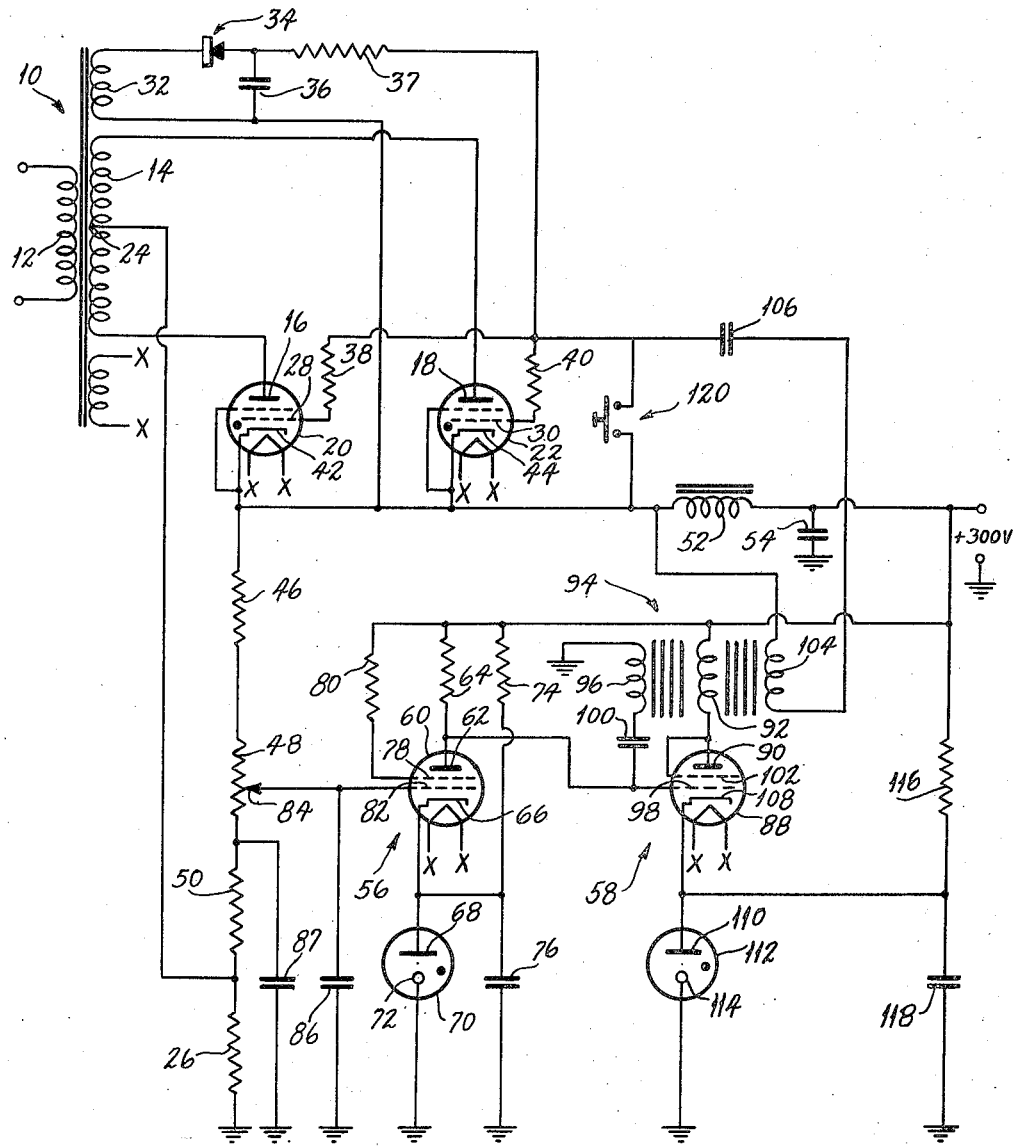
INVENTOR.
REXFORD F. GOODE
BY
HIS ATTORNEYS United States Patent Office 2,829,331
Patented Apr. 1, 1958

2,829,331

VOLTAGE REGULATED POWER SUPPLY

Rexford F. Goode, Washington, D. C., assignor to the United States of America as represented by the Secretary of the Navy Application April 6, 1953, Serial No. 347,189

6 Claims. (Cl. 321—19)

(Granted under Title 35, U. S. Code (1952), sec. 266)

This invention relates to voltage regulated power supplies and is directed particularly to regulated power supplies employing thyratrons as rectifier tubes.

An object of the invention is to provide a thyratron controlled voltage regulated power supply that is operative over a wide range of A.-C. input voltage frequency.

Another object is to provide a power supply of the character described that is substantially insensitive to variations in wave form of the input or line A.-C. voltage.

A further object is to provide a power supply of the above nature that is operative to furnish a regulated D.-C. output voltage over a wide range of input voltage variation.

A further object is to provide a power supply of the character described that is simple and, at the same time, comparatively efficient in converting A.-C. power to D.-C. power.

Other objects and many of the attendant advantages of this invention will be readily appreciated as the same becomes better understood by reference to the schematic drawing, which represents a preferred embodiment of the invention.

In the drawing, the numeral 10 indicates a power transformer, having an input or primary winding 12 supplied by a source of alternating current power (not shown) which, in accordance with the invention, can be allowed to vary over a wide range of frequency and voltage. The transformer 10 is provided with a high voltage secondary winding 14, the terminals of which are connected each to the anodes 16, 18 of a pair of thyratrons 20, 22, respectively. A center-tap 24 on the secondary winding 14 is connected to ground through a resistor 26 of small ohmic value.

A source of D.-C. bias voltage in the order of minus forty volts for the grids 28, 30 of the thyratrons 20, 22 is provided, the same comprising a low voltage secondary winding 32 on the transformer 12, in series with which are connected a rectifier element 34, which may be of the dry rectifier type, and a condenser 36. The common junction point of the rectifier element 34 and the condenser 36 is connected through a resistor 37 to one terminal each of a pair of isolating resistors 38, 40, the other terminals of which are connected to the grids 28, 30, respectively, of the thyratrons 20, 22. The cathodes 42, 44 of the thyratrons are connected in common through a voltage divider circuit comprising a resistor 46, a potentiometer 48, a resistor 50 and the resistor 26, in series, to ground. The regulated output voltage is derived through a filter network comprising the series choke coil 52 and the parallel to ground filter condenser 54, from the cathodes 42, 44 of the thyratrons 20, 22.

Means comprising a D.-C. amplifier circuit, indicated generally by the numeral 56, and a pulse generator, indicated generally by the numeral 58, is provided for controlling the firing angle of the thyratron rectifiers 20, 22 when the output voltage falls below a certain value.

The amplifier circuit 56 comprises a vacuum tube pentode 60, having its anode 62 connected through a load resistor 64 to the positive voltage terminal of the regulated power supply output, and its cathode 66 connected to the anode 68 of a voltage regulator tube 70, the cathode 72 of which is connected to ground. The anode of said voltage regulator tube is energized through a current-limiting resistor 74 connected to the positive voltage terminal of the regulated power supply output. A filter condenser 76 is connected between the anode 68 of the voltage regulator tube 70 and ground. The screen grid 78 of the pentode 60 is connected through a resistor 80 to the positive voltage terminal of the regulated power supply output. The control grid 82 of the pentode 60 is connected to the movable contact 84 of the potentiometer 48. A filter condenser 86 is connected between the pentode grid 82 and ground. A second filter condenser 87 is connected between the common junction point of potentiometer 48 and resistor 50 and ground.

The pulse generator 58 comprises a vacuum tube pentode 88 having its anode 90 connected through the primary winding 92 of a triple-winding pulse transformer 94 to the positive voltage terminal of the regulated power supply output. The feed-back winding 96 of the transformer 94 has one terminal connected to ground and the other terminal connected to the grid 98 of the pentode 88 through a blocking condenser 100. The screen grid 102 of the pentode 88 is connected to the anode 90. The output winding 104 of the pulse transformer 94 has one terminal connected to the cathodes 42, 44 of the thyratrons 20, 22, and the other terminal connected through a blocking condenser 106 to the common junction point of the isolating resistors 38, 40.

The cathode 108 of the pentode 88 is connected to the anode 110 of a voltage regulator tube 112, the cathode 114 of which is connected to ground. The anode 110 of said voltage regulator tube is energized through a current-limiting resistor 116 connected to the positive voltage terminal of the regulated power supply output. A filter condenser 118 is connected between the anode 110 of the voltage regulator tube 112 and ground.

A normally-open single-pole single-throw starting switch 120 is connected between the cathodes 42, 44 of the thyratrons 20, 22 and the common junction point of the isolating resistors 38, 40 to the grids thereof.

*Operation*

The source of D.-C. bias voltage derived from the winding 32 of the transformer 10 prevents conduction by the thyratron rectifier tubes 20, 22 until the starting switch 120 is momentarily closed, thereby shorting out said bias to allow conduction. This action builds up a D.-C. output voltage across condenser 54 in the usual manner. After opening of starting switch 120, the thyratron rectifiers are fired by pulses from the output winding 104 of the transformer 94 associated with the pulse generator circuit 58, as hereinbelow described.

The cathode 66 of the amplifier pentode 60 is stabilized at approximately +75 volts by the voltage regulator tube 70. The ripple voltage at the cathode 42, 44 of the thyratrons 20, 22 is filtered by the filter network comprising the series resistor 46 and the filter condenser 86 and a portion of this voltage is applied as D.-C. voltage with an A.-C. voltage component to the control grid 82 of the pentode amplifier tube 60 through the movable contact 84 of the potentiometer 48. The voltage at the control grid of said tube is of the order of +70 volts and the amplitude of the superimposed A.-C. voltage is of the order of 2 volts, while its frequency is twice the line voltage due to full-wave rectification. The A.-C. component is shifted in phase through the action of the above-mentioned filter network by an amount less than 90 degrees lagging. Thus, the D.-C. level at the control grid 82 of the pentode 60 is compared to the regulated voltage at its cathode and the difference is employed to control the pulse generator 58, which, in turn, controls the firing of the thyratron rectifiers 20, 22. The ripple voltage serves to synchronize the firing of the rectifiers with the supply or line frequency and will be more fully explained hereinafter.

In detail, the operation of the circuit is as follows: Consider that portion of the cycle during which the thyratron rectifier 20 is conducting and the ripple component of the rectified output voltage is increasing. Assume that the output current for the time being is maintained constant. Under these conditions the ripple voltage on the control grid 82 of the D.-C. amplifier pentode 60 will be increasing, but will have a phase angle lag caused by the phase-shifting network associated therewith. The voltage on the control grid 98 of pulse generator pentode 88 will therefore, because of the 180 degree phase shift in amplification, be decreasing. At some later instant, as the thyratron rectifier cathode voltage decreases, the voltage on the control grid 98 of the pulse generator pentode will be increasing. The value of regulated reference voltage at the cathode 108 of the pulse generator pentode 88 which is stabilized by voltage regulator tube 112 and the other circuit constants are so arranged that as the control grid voltage of said pentode increases it will pass a critical voltage after which the pulse generator 58 becomes a free-running blocking oscillator and generates a series of pulses. These pulses are applied between grid and cathode of thyratron rectifiers 20 and 22 via the blocking condenser 106 and the isolating resistors 38 and 40. Proper choice of the circuit constants of the pulse generator circuit 58 makes these pulses of a frequency of several orders of magnitude higher than the highest power frequency expected. By adjustment of the potentiometer movable contact 84, the sensitivity of the amplifier circuit 56 can be controlled for optimum regulation.

Thyratron rectifier 20 is already conducting in accordance with the original assumption. Rectifier 22 will become conducting as a result of the pulses being applied to its grid 30 causing the cathode voltage of the thyratrons 20, 22 to start rising, and rectifier 20 will cease to conduct because its plate voltage becomes negative. The sequence of operations is then repeated, in each case the pulse of ripple voltage from one thyratron rectifier acting to excite the pulse generator and cause conduction in the other rectifier during the subsequent half-cycle of power frequency. If the average value of input A.-C. voltage to the power transformer 10 increases, then the average D.-C. level on the control 82 grid of the D.-C. amplifier pentode 60 will rise and the average value on the control grid 98 of pulse generator pentode 88 will fall. Consequently, the ripple voltage applied to control grid 98 will not cause it to break into oscillation as early in the cycle as was the case for a lower value of input supply voltage to the transformer 10. This results in the firing of the rectifier tube at a later time during the cycle, reducing the average current passed by the thyratron tubes, and thereby acting to compensate for the increase in supply voltage. Decreases in supply voltage act in a corresponding manner but in the opposite sense.

If the load current should increase, the voltage across resistor 26 becomes more negative. This causes the control grid 98 of pulse generator pentode 88 to become more positive with result that pulse oscillation takes place at an earlier phase angle. This tends to make the thyratrons rectifier pass more current, which is the effect required in order to maintain the output voltage constant. In the absence of this effect, the output voltage would drop as a result of the increased current flowing through the internal resistance of the thyratron rectifier tubes and power source. If resistor 26 is too large, over-control will result; that is, an increased load current will cause a rise in voltage. Preferably, resistor 26 is selected to be of such value as to cause the output voltage to remain substantially constant and independent of the current demands of the load.

One advantage of the voltage regulated power supply herein disclosed is that the negative bias applied to the thyratrons can be quite large so as to minimize deionization time, thereby allowing the thyratrons to operate at high line frequencies without going into continuous conduction.

Another advantage is that control of the thyratrons is unaffected by the wave-form of the line frequency.

In order that the invention can be practiced with the least amount of routine design engineering, the following list of circuit element values is given as being preferable for the construction of a 300 volt power supply:

Resistors:

| | Ohms |
|---|---|
| 26 | 15 |
| 37 | 15,000 |
| 38 | 2,200 |
| 40 | 2,200 |
| 46 | 200,000 |
| 50 | 50,000 |
| 64 | 300,000 |
| 74 | 50,000 |
| 80 | 300,000 |
| 116 | 50,000 |

Condensers:

| | | |
|---|---|---|
| 36 | microfarads | 1 |
| 54 | do | 12 |
| 76 | do | .1 |
| 86 | do | .2 |
| 87 | do | 1 |
| 100 | micromicrofarads | 500 |
| 118 | microfarads | .1 |

| | |
|---|---|
| Potentiometer 48 ohms | 200,000 |
| Choke coil 52 henries | 2 |
| Thyratron tubes 20,22 | 2D21 |
| Pentode tubes 60, 88 | 6AG5 |
| Regulator tube 70 | VR75 |
| Regulator tube 112 | OB2 |

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

I claim:

1. Apparatus for deriving a substantially constant D.-C. load voltage from an A.-C. source subject to both voltage and frequency fluctuations, comprising a pair of grid-controlled rectifier tubes coupled to said A.-C. source in such a manner as to be normally conductive alternately, a source of negative bias voltage for said rectifier tubes, a D.-C. amplifier operating at a predetermined threshold voltage level a filter circuit electrically connected between said rectifier tubes and said D.-C. amplifier, means for initiating conduction of said rectifier tubes so as to build up across said filter circuit a substantially smooth D.-C. potential having an A.-C. ripple voltage superimposed thereon, a phase-shifting network, means for applying the A.-C. ripple voltage developed in said filter circuit through said phase-shifting network to said D.-C. amplifier so that the magnitude of such ripple voltage is compared to the said threshold voltage, a pulse generator adapted to be gated so as to produce a series of pulses higher in frequency than the frequency of said A.-C. source, means for applying the output of said D.-C. amplifier to gate said pulse generator, and means for applying the pulse output of said generator to the grids of said rectifier tubes so as to overcome the said negative bias voltage and hence control the conduction of said rectifier tubes in opposite sense to fluctuations in the voltage of said A.-C. source, thereby to maintain substantially constant said D.-C. load voltage regardless of fluctuations in the A.-C. source.

2. Apparatus according to claim 1 in which said pulse generator comprises a blocking oscillator.

3. Apparatus according to claim 2 in which said blocking oscillator is provided with a negative bias which maintains the oscillator inoperative until the amplitude of the voltage received thereby from the said D.-C. amplifier exceeds a predetermined value.

4. A voltage regulated power supply for converting A.-C. to D.-C. comprising a full-wave rectifier circuit having a pair of thyratrons as rectifiers, a voltage divider circuit connected across the rectified output voltage of said rectifier circuit, means for applying a negative bias voltage to the grids of said thyratrons so that they are normally non-conductive, a pulse generator of frequency substantially greater than twice that of the frequency of the A.-C. input voltage to said full-wave rectifier, said pulse generator being normally biased to non-conduction, means connecting said pulse generator to the grids of said thyratrons for intermittently overcoming said negative bias means to allow intermittent conduction by said thyratrons, a voltage tap on said voltage divider, and means controlled by the rectified voltage at said voltage tap for controlling the operation of said pulse generator so that a change in the average value of said rectified A.-C. voltage causes a change in the average control time of said pulse generator and a consequent corresponding change in the average current passed by said thyratron tubes in such a sense as to automatically compensate for variations in input line voltage and output load current of said power supply said pulse generator controlling means comprising a D.-C. amplifier having its output connected so as to unbias said pulse generator to allow intermittent conduction therein in synchronism with the ripple voltage frequency of said rectified A.-C. output voltage.

5. The invention as defined in claim 4 including a phase-shifting network connected to the input of said D.-C. amplifier circuit.

6. The invention as defined in claim 5 wherein said D.-C. amplifier and said pulse generator derive energization voltages from the output of said power supply, and including an LC output filter circuit across said rectified output voltage, and manual switch means for momentarily shorting out said bias voltage to said thyratrons to initiate conduction therein prior to self-sustaining energization of said pulse generator and D.-C. amplifier.

References Cited in the file of this patent

UNITED STATES PATENTS

| | | |
|---|---|---|
| 2,467,765 | Mayle | Apr. 19, 1949 |
| 2,630,557 | Bixby | Mar. 3, 1953 |
| 2,688,721 | Bixby | Sept. 7, 1954 |